US011878661B2

(12) United States Patent
Ueta et al.

(10) Patent No.: US 11,878,661 B2
(45) Date of Patent: Jan. 23, 2024

(54) WIPER OPERATION SYSTEM FOR CONSTRUCTION MACHINE

(71) Applicant: KOBELCO CONSTRUCTION MACHINERY CO., LTD., Hiroshima (JP)

(72) Inventors: Toshiro Ueta, Hiroshima (JP); Yuta Suzuki, Hiroshima (JP); Jun Tsuruda, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 592 days.

(21) Appl. No.: 17/054,986

(22) PCT Filed: May 24, 2019

(86) PCT No.: PCT/JP2019/020736
§ 371 (c)(1),
(2) Date: Nov. 12, 2020

(87) PCT Pub. No.: WO2020/003837
PCT Pub. Date: Jan. 2, 2020

(65) Prior Publication Data
US 2021/0213911 A1    Jul. 15, 2021

(30) Foreign Application Priority Data

Jun. 25, 2018  (JP) .................................. 2018-119663

(51) Int. Cl.
*B60S 1/08*   (2006.01)
*B60K 35/00*  (2006.01)
*B60K 37/06*  (2006.01)

(52) U.S. Cl.
CPC ............ *B60S 1/0807* (2013.01); *B60K 35/00* (2013.01); *B60K 37/06* (2013.01); *B60S 1/08* (2013.01)

(58) Field of Classification Search
CPC ........ B60S 1/08; B60S 1/0807; B60S 1/0896; B60S 1/0818
(Continued)

(56) References Cited

U.S. PATENT DOCUMENTS 5,555,502 A * 9/1996 Opel .................... B60K 37/06
                                                             701/36
2010/0181171 A1   7/2010 Kawachi
2016/0258134 A1   9/2016 Matsumoto et al.

FOREIGN PATENT DOCUMENTS

JP    2009-96433 A    5/2009
JP    2010-105613 A   5/2010
(Continued)

OTHER PUBLICATIONS

Extended European Search Report dated Apr. 30, 2021 in European Patent Application No. 19826899.7, 7 pages.
(Continued)

*Primary Examiner* — Gary K. Graham
(74) *Attorney, Agent, or Firm* — Oblon, McClelland, Maier & Neustadt, L.L.P.

(57) ABSTRACT

A wiper operation system for a construction machine, enabling a plurality of wiper operating modes set for the operation of the wiper device to be easily checked and being capable of preventing erroneous selection of the wiper operating mode, includes a display, an operation reception unit that receives a mode selection operation for selecting one wiper motion mode from among a plurality of wiper motion modes, and a wiper control section that makes the wiper device perform a motion in the selected wiper motion mode. The display includes a wiper motion display unit
(Continued)

performing a display of a plurality of icons corresponding to a plurality of wiper action modes respectively, and an identification display enabling the icon of the selected wiper action mode to be identified.

3 Claims, 9 Drawing Sheets

(58) Field of Classification Search
USPC .............. 15/250.3, 250.13, 250.12, 250.001; 318/443, DIG. 2, 444, 445
See application file for complete search history.

(56) References Cited

FOREIGN PATENT DOCUMENTS

| | | |
|---|---|---|
| JP | 5572770 B1 | 8/2014 |
| JP | 2017-179806 A | 10/2017 |
| KR | 10-2007-0041189 A | 4/2007 |

OTHER PUBLICATIONS

International Search Report dated Jul. 16, 2019 in PCT/JP2019/020736 filed on May 24, 2019, 1 page.

\* cited by examiner

WIPER OPERATION SYSTEM FOR CONSTRUCTION MACHINE

TECHNICAL FIELD

The present invention relates to a wiper operation system which enables a wiper device provided in a construction machine such as a hydraulic excavator to be operated.

BACKGROUND ART

In general, a wiper device provided in an automobile can be operated by use of a wiper switch provided in the vicinity of the steering wheel. The wiper switch of an automobile is composed of a switch body mounted on a steering shaft and a switching lever rotatably mounted on a switch body. The switching lever is rotationally operated with the hand by an operator desiring to operate the wiper device. The operator, by changing the rotation angle of the selector lever, can select a desired wiper motion mode from among a plurality of wiper motion modes, for example, stop (OFF), intermittent (INT), continuous low speed (LO), and continuous high-speed (HI).

The above-described provision of the selector lever of the wiper switch in the vicinity of the steering wheel as described above allows an operator to operate the switching lever without releasing his/her hand from the steering wheel. Furthermore, Patent Document 1 discloses a wiper switch including a selector lever which can be operated from the OFF position to the HI position or from the HI position to the OFF position all at once.

On the other hand, for a construction machine such as a hydraulic excavator having no steering wheel, it is difficult to adopt a wiper switch having a switching lever as described above seen in an automobile. Hence, a conventional wiper switch for a construction machine is formed of a single push switch that receives a pushing operation, being provided, for example, in the vicinity of a display for displaying various information of the construction machine, or the like.

In order to allow an operator to select a desired mode from a plurality of wiper motion modes by means of the wiper operation device which is constituted by a single push switch as described above in the construction machine, it can be conceived to associate the number of pushing operations applied to the push switch with the wiper motion mode. For example, it may be conceivable to configure the wiper operating device to make the wiper device perform intermittent motion when the first pushing operation is applied to the push switch while the wiper device is stopped, to make the wiper device perform continuous motion when the second pushing operation is applied to the push switch, and to stop the wiper device when the third pushing operation is applied to the push switch. According to this device, the operator can switch the wiper device from the stop state to the continuous motion state or switch from the intermittent motion state to the stop state, by applying the pushing operation to the push switch twice in succession. Furthermore, the operator can make the wiper device perform one unit of wiping motion, that is, one reciprocating motion, by applying a pushing operation to the push switch three times in succession.

Such device allowing a desired mode to be selected from a plurality of wiper motion modes only by pressing a single push switch, however, prevents the operator from immediately recognizing which wiper motion mode other than the currently executed wiper motion mode can be selected. Besides, the operator is likely to mistake the number of times of application of a pushing operation to the push switch. This makes it difficult for the operator to operate the wiper device surely in the wiper operating mode that the operator desires.

CITATION LIST

Patent Literature

Patent Document 1: Japanese Unexamined Patent Publication No. 2010-105613

SUMMARY OF INVENTION

It is an object of the present invention to provide a wiper operation system for allowing an operator to operate a wiper device in a construction machine, the wiper operation system allowing the operator to easily confirm a plurality of selectable wiper motion modes and the wiper operating mode that is currently being executed, and being capable of reducing erroneous selection of the wiper operating mode.

Provided is a wiper operation system provided to a construction machine including an operator's seat and a wiper device to allow an operator in the operator's seat to perform an operation for selecting a desired wiper motion mode from a plurality of wiper motion modes different from each other in at least one of a motion interval and an operation speed and operating the wiper device in the selected wiper motion mode, the wiper operation system comprising: a display including a display screen and disposed at a position where the display screen can be viewed by an operator in the operator's seat; an operation reception unit that receives a mode selection operation by the operator to select one wiper motion mode from the plurality of wiper motion modes; and a wiper control section that makes the wiper device perform a motion in the wiper motion mode selected by the mode selection operation. The display screen of the display includes a wiper motion display part that performs a display of a plurality of icons indicating the plurality of wiper motion modes that can be selected by the mode selection operation, respectively, and an identification display for enabling the icon corresponding to the wiper motion mode selected by the mode selection operation among the plurality of icons to be identified.

DESCRIPTION OF EMBODIMENTS

An embodiment of the present invention will be explained with reference to the drawings.

Figure 1:
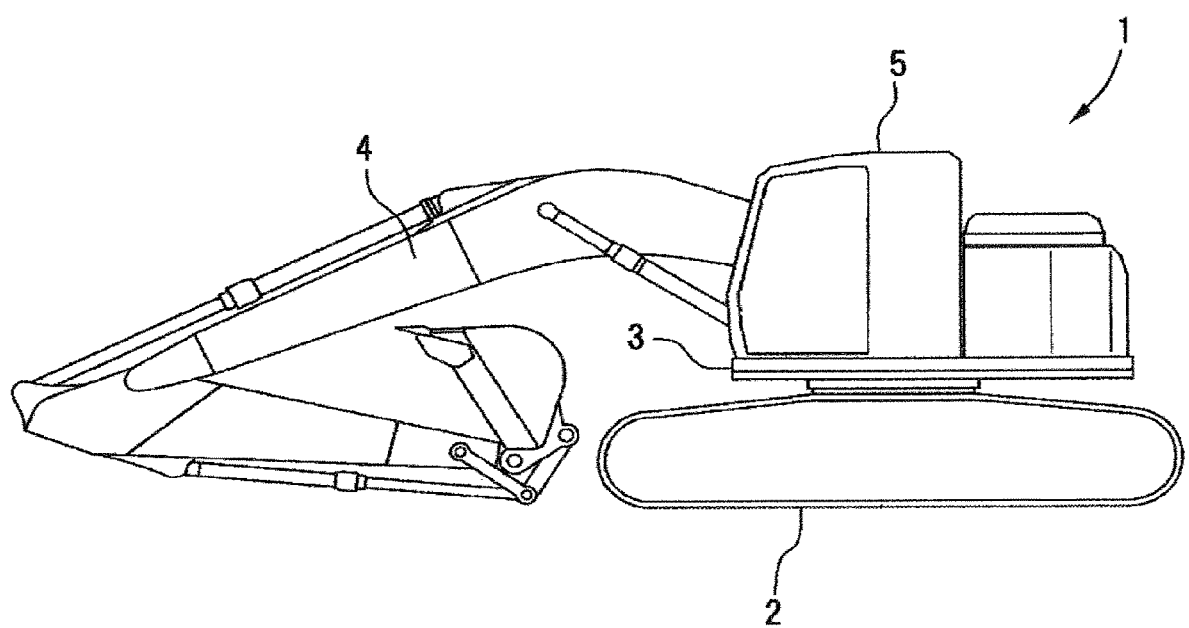
FIG. 1 is a side view of a hydraulic excavator according to an embodiment of the present invention.

FIG. 1 shows a hydraulic excavator 1 which is a construction machine according to the embodiment. The hydraulic excavator 1 includes a lower traveling body 2, an upper swiveling body 3, a working machine 4, and a cabin 5. The upper swiveling body 3 is mounted on the lower traveling body 2 so as to be swivelable. The working machine 4 includes a boom and an arm, being mounted on the front center portion of the upper swiveling body 3 so as to be vertically rotationally movable. The cabin 5 is mounted on a portion that is a front portion of the upper swiveling body 3 and offset in one of the right and left directions.

Figure 2:
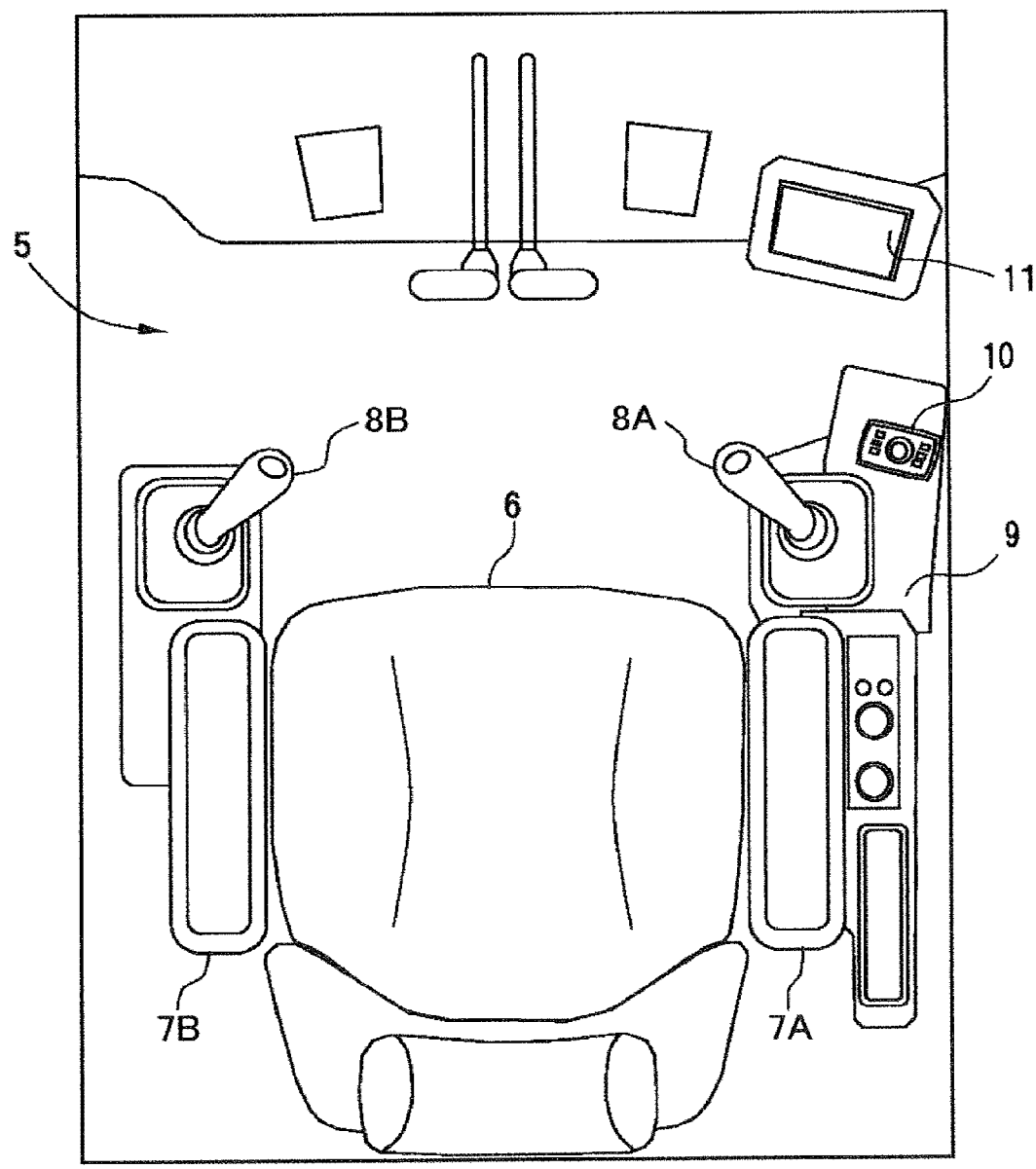
FIG. 2 is a plan view of the interior of a cabin of the hydraulic excavator.

As shown in FIG. 2, in the cabin 5, provided are an operator's seat 6, a right operation lever 8A, a left operation lever 8B, and a side console 9. The operator's seat 6 is a seat allowing an operator to sit thereon. The operator's seat 6 includes a right arm rest 7A and a left arm rest 7B. The right and left operation levers 8A, 8B are disposed just ahead of the right and left arm rests 7A, 7B, respectively, to receive an operation by the operator to move the working machine 4. The side console 9 is disposed on one side of the operator's seat 6 (right side in the drawing) and in the vicinity of the right operation lever 8A.

Figure 3:
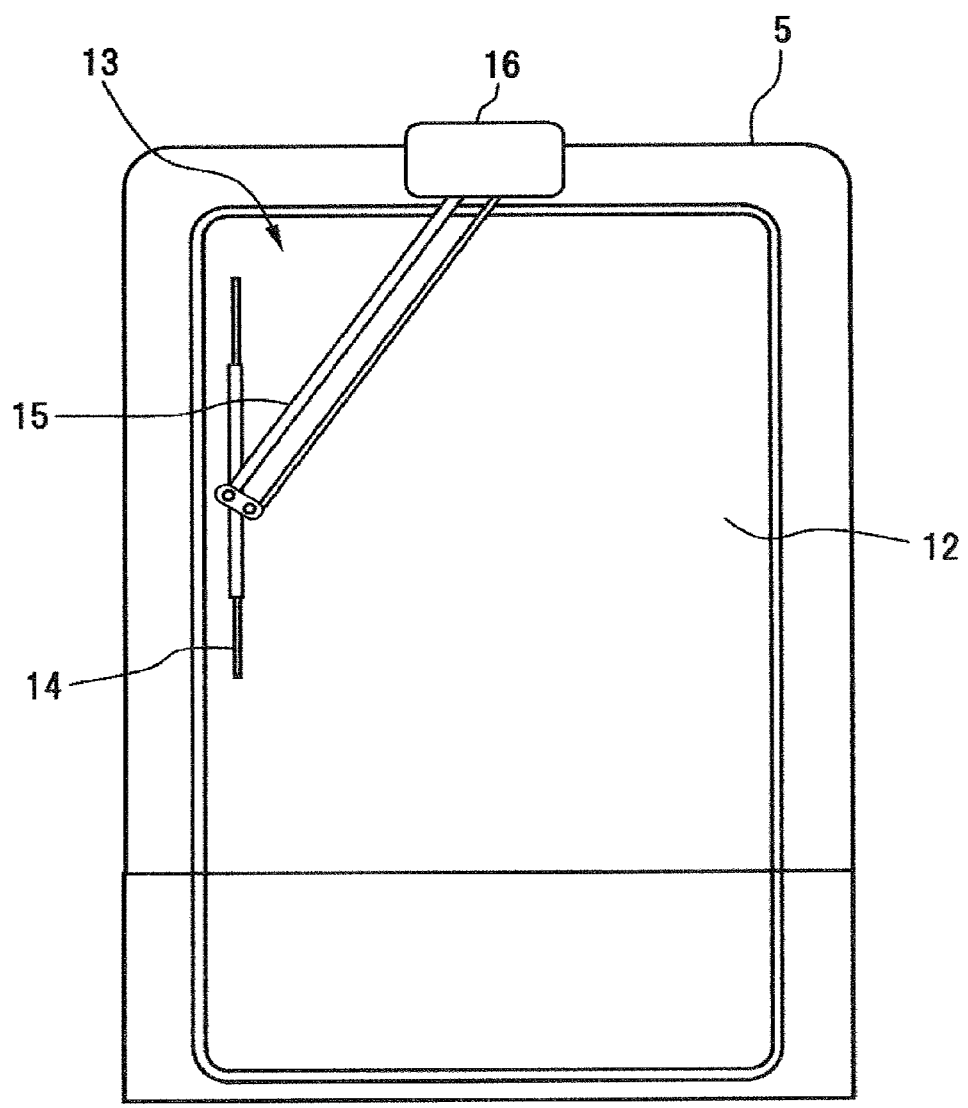
FIG. 3 is a front view showing a front window pane and a wiper device of the cabin.
Figure 4:
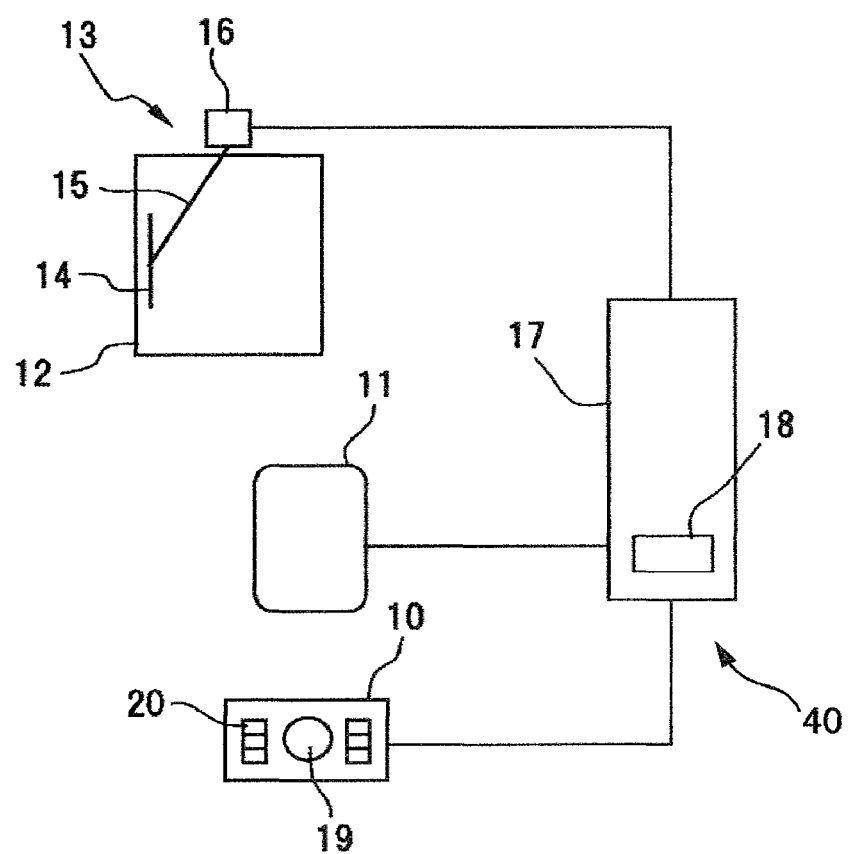
FIG. 4 is a diagram showing a wiper operation system according to the embodiment.

The hydraulic excavator 1 further includes a wiper device 13 shown in FIGS. 3 and 4. The wiper device 13 is provided for a front window pane 12 of the cabin 5. The wiper device 13 includes a wiper blade 14, a wiper arm 15, and a wiper drive motor 16. The wiper blade 14 is disposed on the outer surface of the front window pane 12 so as to wipe off water droplets on the outer surface. The wiper arm 15 has a proximal end coupled to the wiper drive motor 16 and a swinging end that is opposite thereto and coupled to a longitudinal center portion of the wiper blade 14. The wiper drive motor 16 swings the wiper arm 15 to thereby move the wiper blade 14 on the outer surface of the front window pane 12 while keeping the wiper blade 14 in contact with the outer surface.

The hydraulic excavator 1 further includes a wiper operation system 40 as shown in FIG. 4. The wiper operation system 40 enables an operator sitting on the operator's seat 6 to perform a wiper operation. The wiper operation is an operation for selecting a desired wiper motion mode from a plurality of wiper motion modes different from each other in at least one of an operation interval and an operation speed, and operating the wiper device of the construction machine in the selected wiper motion mode. The wiper operation system 40 includes a switch panel unit 10, a display 11, and a control unit 17. The switch panel unit 10 and the display 11 is electrically connected to the control unit 17 independently of each other.

Figure 5:
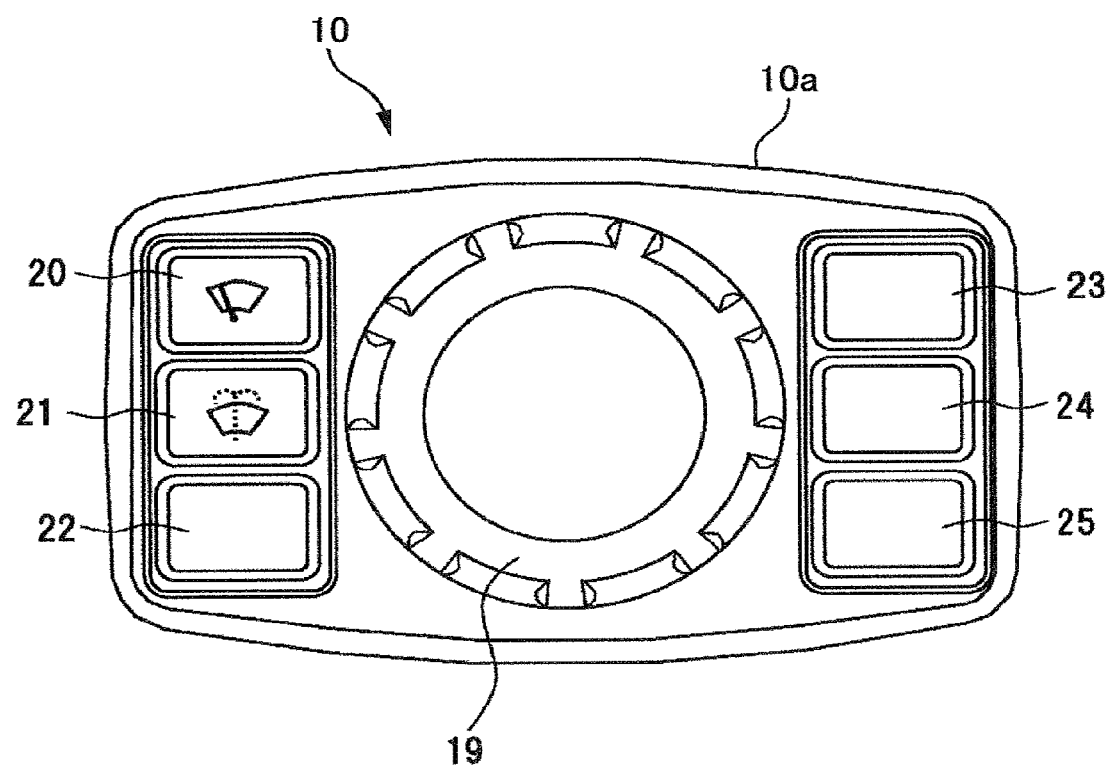
FIG. 5 is a plan view of a switch panel unit included in the wiper operation system.

The switch panel unit 10 is disposed in the cabin 5, on the side console 9 in this embodiment, to serve as an operation reception unit that receives a mode selection operation by the operator. The mode selection operation is an operation that is applied to the switch panel unit 10 by the operator to select one of the plurality of wiper motion modes. Specifically, as shown in FIG. 5, the switch panel unit 10 includes a panel body 10a, a dial switch 19, and a plurality of push switches 20, 21, 22, 23, 24, and 25 which are six in total in this embodiment.

The dial switch 19 is mounted on the panel body 10a so as to be capable of receiving a rotational operation of rotating the dial switch 19 about a vertical axis and a pushing down operation of pushing down the dial switch 19. The dial switch 19 is formed in a substantially cylindrical shape having a size that allows an operator to pinch the dial switch 19 with his/her hand, so as to be capable of receiving the rotational operation. Each of the plurality of push switches 20 to 25 is mounted on the panel body 10a so as to receive a pushing operation.

In this embodiment, the dial switch 19 is disposed in the center of the panel body 10a; the three push switches 20, 21, 22 of the plurality of push switches 20 to 25 are arranged on one side of the dial switch 19 with respect to the right and left directions (on the left side in FIG. 5); and the other three push switches 23, 24, 25 are arranged vertically on the other side of the dial switch 19 (on the right side in the drawing).

Each of the plurality of push switches 20 to 25 has a flat shape with a height dimension smaller than the height dimension of the dial switch 19, being formed in a size suitable for an operator to push each of the push switches 20 to 25 with a fingertip.

Different functions are assigned to the plurality of push switches 20 to 25, and the pushing operation applied to each of the plurality of push switches 20 to 25 corresponds to an operation for selecting a function corresponding to the push switch to which the operation is applied. Each of the plurality of push switches 20 to 25 is provided with a mark indicating the function corresponding thereto. Among the plurality of push switches 20 to 25, a wiper operation function is assigned to the push switch 20 disposed on the left side of the dial switch 19, in this embodiment, and a mark indicating the wiper operation is provided to the push switch 20.

Among the plurality of push switches 20 to 25, the push switch 21 is a switch to which an operation for flowing fouling of the front window pane 12 with a washer liquid is applied, and the push switch 21 is provided with a mark indicating ejection of water. The functions assigned to the other push switches 22, 23, 24, and 25 are independent of the wiper device 13; hence, the description of the other push switches 22, 23, 24, and 25 is omitted.

The display 11 is formed of a liquid crystal panel or the like, providing an operator with various types of visualized information at the time of work by the hydraulic excavator 1 or the like. In this embodiment, the display 11 also functions as the display constituting the wiper operation system 40.

Figure 6:
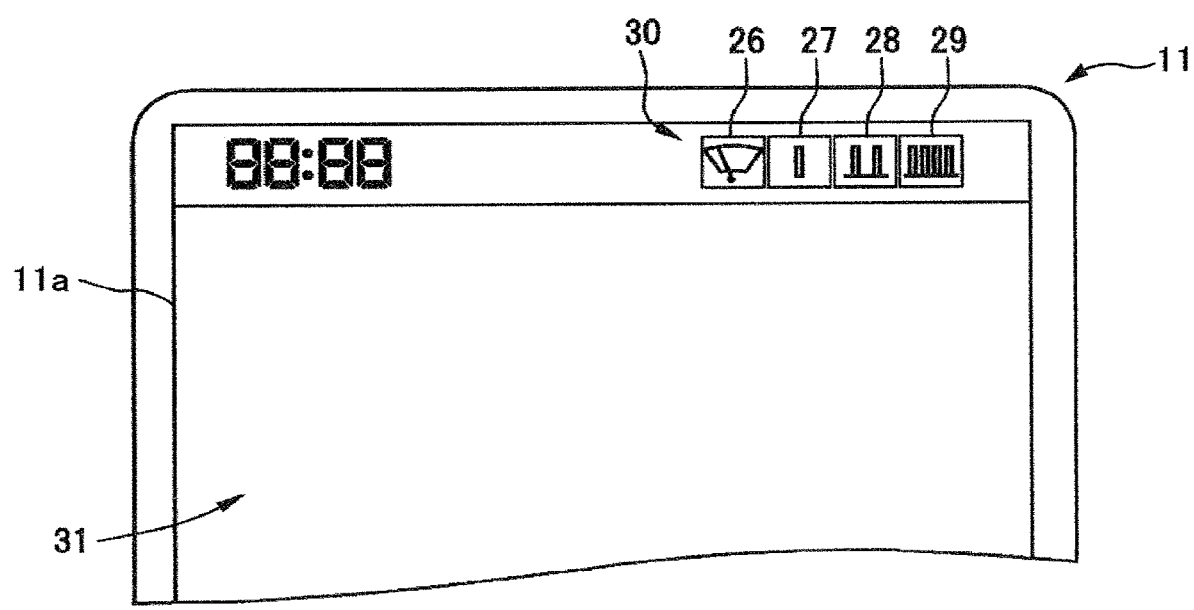
FIG. 6 is a diagram showing a main part of the display provided by a display included in the wiper operation system.

Specifically, the display 11 includes a display screen 11a as shown in FIG. 6, being disposed at a position where the display screen 11a can be viewed by an operator seated in the operator's seat 6, that is, the position frontward of the operator's seat 6 in this embodiment, as shown in FIG. 2. The display screen 11a includes a partial region which forms a wiper motion display part 30 as shown in FIG. 6. On the wiper motion display part 30A, displayed are a plurality of icons relating to the operation of the wiper device 13. On the region 31 other than the wiper motion display part 30 in the display screen 11a, each of not-graphically-shown information about the hydraulic excavator 1 is displayed.

Figure 7:
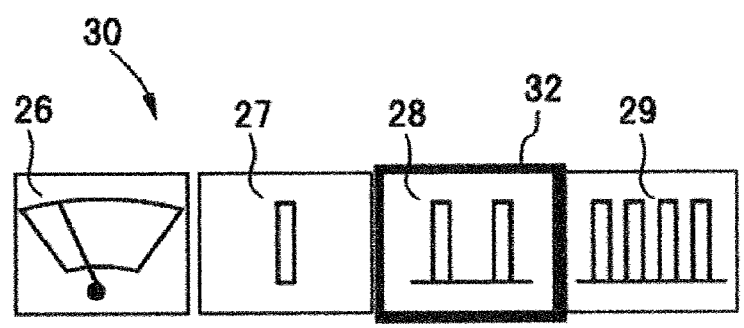
FIG. 7 is a diagram showing a state in which an intermittence mode icon is highlighted on the wiper motion display part of the display.
Figure 8:
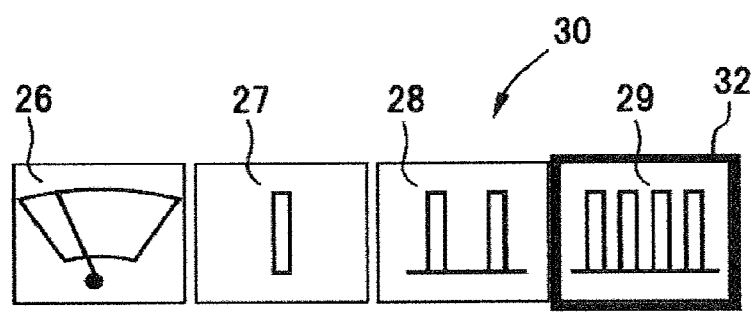
FIG. 8 is a diagram showing a state in which a continuation mode icon is highlighted on the wiper motion display part.
Figure 9:
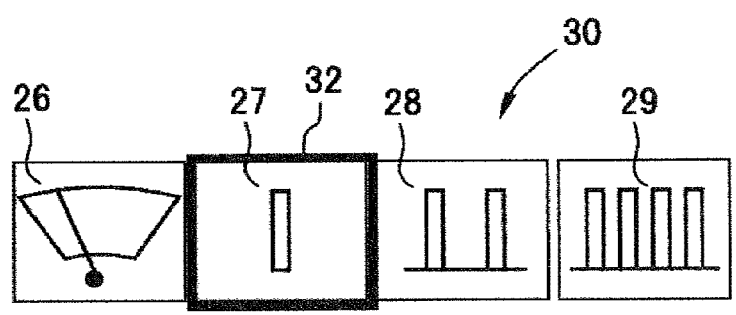
FIG. 9 is a diagram showing a state in which a one-time mode icon is highlighted in the wiper motion display part.

The plurality of icons to be displayed on the wiper motion display part 30 include a wiper ON icon 26, a one-time mode icon 27, an intermittence mode icon 28, and a continuation mode icon 29, which icons are shown in order from the left in FIGS. 7 to 9. The wiper ON icon 26 indicates that the wiper device 13 is in an ON state. The one-time mode icon 27, the intermittence mode icon 28, and the continuation mode icon 29 are mode icons indicating the plurality of wiper motion modes, respectively.

The one-time mode icon 27 indicates a one-time motion mode included in the plurality of wiper motion modes. In the one-time motion mode, the wiper blade 14 of the wiper device 13 performs only one reciprocating wiping motion.

The intermittence mode icon 28 indicates intermittent motion mode included in the plurality of wiper motion modes. In the intermittent motion mode, the wiper blade 14 of the wiper device 13 performs intermittent reciprocating motions.

The continuation mode icon 29 indicates a continuous motion mode included in the plurality of wiper motion modes. In the continuous motion mode, the wiper blade 14 of the wiper device 13 performs continuous reciprocating motions.

The shapes of the icons according to the present invention are not limited to those shown in FIGS. 7 to 9. Besides, respective wiper motion modes corresponding to the icons are not limited to the one-time motion mode, the intermittent motion mode, and the continuous motion mode. The icons according to the present invention broadly encompass those that allow an operator to visually recognize a wiper operating mode corresponding to the icon.

The plurality of wiper motion modes can be selected by a rotational operation applied to the dial switch 19 of the switch panel unit 10 by the operator. The control unit 17 is composed of a microcomputer or the like, including a wiper control section that controls the operation of the wiper device 13, and a memory 18 as a mode storage section. The wiper control section controls the motion of the wiper device 13 so that the wiper device 13 moves in the wiper motion mode selected as described above. Thus, the selected wiper motion mode is executed by the control of the wiper device 13 by the wiper control section of the control unit 17.

The control unit 17 further includes a display control section. The display control section inputs a command signal to the wiper motion display part 30 so as to control the display on the wiper motion display part 30. That is, the control unit 17 includes both the wiper control section and the display control section.

The display control section of the control unit 17 provides an identification display to the icon corresponding to the wiper motion mode selected by the rotational operation of the dial switch 19 among the three mode icons 27, 28, and 29. The identification display is a display that allows an operator to identify the icon to which the identification display is provided. The identification display according to this embodiment is a frame-shaped cursor 32, which is provided on the outer periphery of the icon to highlight the icon to be identified. The cursor 32 highlights one of the three mode icons 27, 28, 29 for respective displays of the plurality of wiper motion modes, thereby allowing an operator to visually judge which of the plurality of wiper operating modes has been selected. The cursor 32 sequentially highlights the three mode icons 27, 28, and 29 in conjunction with the rotational operation applied to the dial switch 19.

Next will be described an operation applied to the switch panel unit 10 and the action of the wiper device 13 executed based on the operation.

When an operator pushes the push switch 20 for wiper operation provided on the switch panel unit 10, the display control section of the control unit 17 makes the wiper motion display part 30 in the display screen 11a of the display 11 display the wiper ON icon 26 and the three mode icons 27, 28, and 29, as shown in FIGS. 7 to 9.

At this time, the display control section sets the display on the wiper motion display part 30 of the display 11 to an initial setting display. Specifically, the cursor 32 as the identification display is provided to the intermittence mode icon 28 to highlight the intermittence mode icon 28. Thus, in the present embodiment, the intermittent motion mode is set to the initial motion mode.

When desiring, for example, a continuous motion mode, the operator applies a rotational operation to the switch panel unit 10, while watching the display 11, to thereby bring the cursor 32 into a state of highlighting the continuation mode icon 29 as shown in FIG. 8. At this time, the wiper control section of the control unit 17 sequentially switches the wiper motion mode currently selected among the plurality of wiper motion modes along with the rotational operation. The display control section of the control unit 17, thus, controls the display on the wiper motion display part 30 such that the icon to which the cursor 32 is provided is sequentially switched among the three mode icons 27 to 29 in response to the rotational operation applied to the dial switch 19, that is, such that the cursor 32 is sequentially shifted to the three mode icons 27 to 29. Besides, this allows the operator to recognize the wiper motion display mode that is currently selected, based on the icon highlighted by the cursor 32. For example, based on the highlighting of the continuation mode icon 29 by the cursor 32, the operator can easily recognize that the currently selected wiper motion mode is the continuous motion mode corresponding to the continuation mode icon 29. In this state, when the operator applies a pushing down operation to the dial switch 19, the wiper control section determines the wiper motion mode to be executed among the plurality of wiper motion modes to the continuous motion mode, and controls the motion of the wiper device 13 so as to make the wiper device 13 move in the continuous motion mode.

When desiring to stop the wiper device 13, the operator applies to the push switch 20 a pushing operation only once. In response to this pushing operation, the wiper control section of the control unit 17 immediately stops the motion of the wiper device 13 and stores the current wiper motion mode, that is, the continuous motion mode in this example, in the memory 18 of the control unit 17. The memory 18, thus, functions as a mode storage section that stores the wiper motion mode immediately before the stop of the wiper device 13 by the pushing operation applied to the push switch 20. Thereafter, when restarting the wiper device 13 in response to the pushing operation reapplied to the push switch 20, the wiper control section of the control unit 17 calls the wiper motion mode (here, a continuous motion mode) which is the mode at the last stop and stored in the memory 18, and controls the motion of the wiper device 13 so as to make the wiper device 13 move in the continuous motion mode.

When desiring to switch to the one-time motion mode during the motion of the wiper device 13 in the intermittent motion mode, the operator applies a rotational operation to the dial switch 19, while watching the display 11 in the same manner as described above, and stops the rotational operation of the dial switch 19 at a state where the cursor 32 highlights the one-time mode icon 27 as shown in FIG. 9.

By thereafter applying a pushing down operation to the dial switch 19, the operator can fix the wiper operating mode to be executed to the one-time operating mode. Specifically, the wiper control section of the control unit 17 determines the wiper motion mode to be executed to the one-time motion mode, based on the pushing down operation, and controls the motion of the wiper device 13 so as to move the wiper device 13 in the one-time motion mode. In the one-time motion mode, one wiping motion of the wiper blade 14 is performed each time when one pushing down operation, which is the operation to determine the wiper motion mode in the other modes, is applied to the dial switch 19.

The system described above enables an operator to select the wiper motion mode by the rotational operation on the dial switch 19 while checking the currently selected wiper motion mode through watching the display 11. This makes it possible to reliably prevent erroneous selection of the wiper operating mode. Furthermore, the operator, allowed to start and stop the operation of the wiper device 13 only by application of the pushing operation to the push switch 20, can quickly stop the wiper device 13.

Although the control unit 17 according to the above-described embodiment includes the memory 18 that stores the wiper motion mode immediately before the wiper device 13 stops and performs control to make the wiper device 13 move in the wiper motion mode stored in the memory 18 when restarting the wiper device 13, the present invention is not limited to one that includes the memory 18, namely, the mode storage section. The wiper control section of the wiper device 13 may execute control to move the wiper device 13 in a new predetermined wiper motion mode every time when the wiper device 13 is restarted.

The plurality of wiper motion modes that can be selected are not limited to the one-time motion mode, the intermittent motion mode, and the continuous motion mode, and respective mode icons corresponding to the plurality of wiper motion modes are also not limited to the icons 27, 28, and 29. The plurality of wiper motion modes may include, for example, a plurality of intermittent motion modes different from each other in operation intervals. Alternatively, a plurality of successive operating modes may be included that differ from each other in operating speed.

The wiper device that is allowed to be operated by the wiper operation system according to the present invention is not limited to one that wipes water droplets on the front window pane 12 of the cabin 5 as the wiper device 13. The wiper operation system according to the present invention can also be suitably employed for a wiper device for wiping a window pane other than the front window pane 12, for example, a window pane provided in a ceiling portion or a rear portion of a cabin.

The construction machine on which the wiper operation system according to the present invention is installed is not limited to the hydraulic excavator 1. The wiper operation system according to the invention can be widely applied to construction machines, e.g., cranes, which may work outdoors in rainy weather.

As described above, there is provided a wiper operation system for allowing an operator to operate a wiper device in a construction machine, the wiper operation system allowing the operator to easily confirm a plurality of selectable wiper motion modes and the wiper operating mode that is currently being executed, and being capable of reducing erroneous selection of the wiper operating mode.

Provided is a wiper operation system provided to a construction machine including an operator's seat to allow an operator in the operator's seat to allow an operator in the operator's seat to perform an operation for selecting a desired wiper motion mode from a plurality of wiper motion modes different from each other in at least one of a motion interval and an operation speed and operating the wiper device in the selected wiper motion mode, the wiper operation system comprising: a display including a display screen and disposed at a position where the display screen can be viewed by an operator in the operator's seat; an operation reception unit that receives a mode selection operation by the operator to select one wiper motion mode from the plurality of wiper motion modes; and a wiper control section that makes the wiper device perform a motion in the wiper motion mode selected by the mode selection operation. The display screen of the display includes a wiper motion display part that performs a display of a plurality of icons indicating the plurality of wiper motion modes that can be selected by the mode selection operation, respectively, and an identification display for enabling the icon corresponding to the wiper motion mode selected by the mode selection operation among the plurality of icons to be identified.

The combination of the display of the plurality of icons on the wiper motion display part and the identification display of the icon corresponding to the selected wiper motion mode among the plurality of icons allows an operator to easily confirm the currently selected wiper motion mode and further the wiper motion mode that is not selected. Specifically, the operator can finally select a desired wiper motion mode while confirming the currently selected wiper motion mode through the display on the wiper motion display part. This makes it possible to prevent erroneous selection of the wiper operating mode.

Preferably, the operation reception unit includes a push switch that receives a pushing operation for starting and stopping the operation of the wiper device and a dial switch that receives a rotational operation for selecting one icon from the plurality of icons displayed on the wiper motion display part of the display, and the wiper control section is configured to control the wiper device so as to make the wiper device perform a motion in the wiper motion mode corresponding to the icon selected by the dial switch.

The combination of the push switch and the dial switch enables an on/off operation for starting and stopping the operation of the wiper device and a mode selection operation for selecting one icon from among the plurality of icons displayed on the wiper motion display part of the display and selecting a wiper motion mode corresponding to the icon to be performed independently of each other. This enables both a rapid selection of the wiper operating mode by the application of the rotational operation to the dial switch and a rapid stoppage of the wiper device by the application of the pushing operation to the push switch during the operation of the wiper device to be performed.

Preferably, the dial switch is capable of receiving the rotational operation and a pushing operation of pushing the dial switch, and the wiper control section is configured to switch the wiper motion mode that is currently selected, among the plurality of wiper motion modes, in association with the rotational operation applied to the dial switch, and configured to make the wiper device perform a motion in the wiper motion mode that is selected when the pushing operation is applied to the dial switch. This makes it possible to quickly select and determine the wiper operating mode through the combination of the rotational operation and pushing operation applied to the same dial switch.

It is preferable that the wiper operation system further comprises a mode storage section that stores the wiper motion mode immediately before the motion of the wiper device is stopped by the pushing operation applied to the push switch, and the wiper control section is configured to make the wiper device perform a motion in the wiper motion mode stored in the mode storage section when the wiper device is restarted by the pushing operation applied to the push switch.

The combination of the mode store section and the wiper control section enables the wiper device to be automatically restarted in the wiper operating mode just before the stop thereof. This makes it possible to release an operator from troublesomeness of newly selecting the wiper operating mode when restarting the wiper device.

The invention claimed is:

1. A wiper operation system provided in a construction machine including an operator's seat and a wiper device to allow an operator in the operator's seat to perform an operation for selecting a desired wiper motion mode from a plurality of wiper motion modes different from each other in at least one of a motion interval and an operation speed and operating the wiper device in the selected wiper motion mode, the wiper operation system comprising:
- a display including a display screen and disposed at a position where the display screen can be viewed by an operator in the operator's seat;
- an operation reception unit that receives a mode selection operation by the operator to select one wiper motion mode from the plurality of wiper motion modes;
- a wiper control section that makes the wiper device perform a motion in the wiper motion mode selected by the mode selection operation,
- wherein the display screen of the display includes a wiper motion display part that performs a display of a plurality of icons indicating the plurality of wiper motion modes that can be selected by the mode selection operation, respectively, and an identification display for enabling the icon corresponding to the wiper motion mode selected by the mode selection operation among the plurality of icons to be identified,
- wherein the operation reception unit includes a push switch that receives a pushing operation to start and stop the motion of the wiper device and a dial switch that receives a rotational operation to select one icon from the plurality of icons, and the wiper control section is configured to make the wiper device perform a motion in the wiper motion mode corresponding to the icon selected by the dial switch.

2. The wiper operation system of the construction machine according to claim 1, wherein the dial switch receives the rotational operation and a pushing operation of pushing the dial switch, and the wiper control section is configured to switch the wiper motion mode that is currently selected among the plurality of wiper motion modes in association with the rotational operation applied to the dial switch, and configured to make the wiper device perform a motion in the wiper motion mode that is selected when the pushing operation is applied to the dial switch.

3. The wiper operation system of the construction machine according to claim 1, further comprising a mode storage section that stores the wiper motion mode immediately before a time when the motion of the wiper device is stopped by the pushing operation applied to the push switch, wherein the wiper control section is configured to make the wiper device perform a motion in the wiper motion mode stored in the mode storage section when the wiper device is restarted by the pushing operation applied to the push switch.

* * * * *